2,608,811

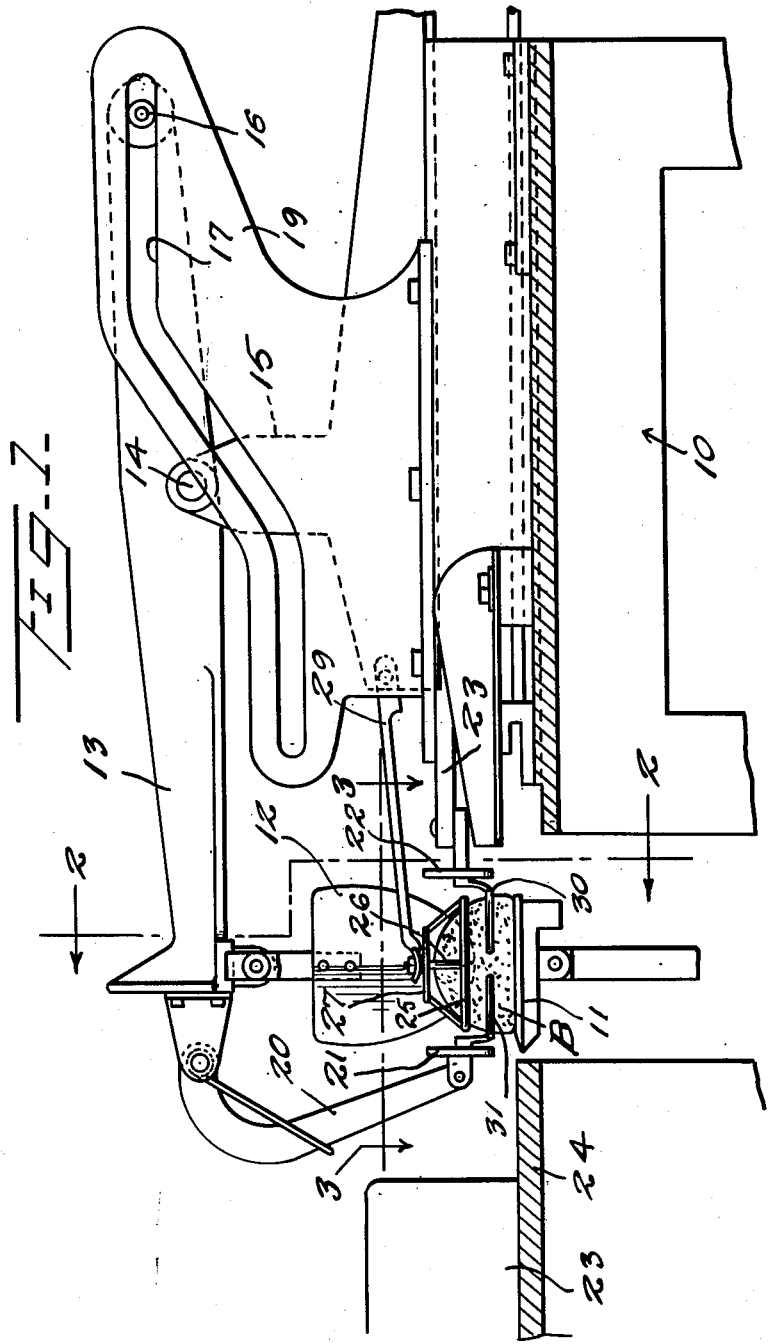
Sept. 2, 1952   B. STERN   2,608,811
BREAD WRAPPING MACHINE
Filed Feb. 5, 1951   3 Sheets-Sheet 1
INVENTOR
Benjamin Stern
BY Kimmel & Crowell
ATTORNEYS Sept. 2, 1952　　　　　　　B. STERN　　　　　　　2,608,811
BREAD WRAPPING MACHINE
Filed Feb. 5, 1951　　　　　　　　　　　　　　3 Sheets-Sheet 2
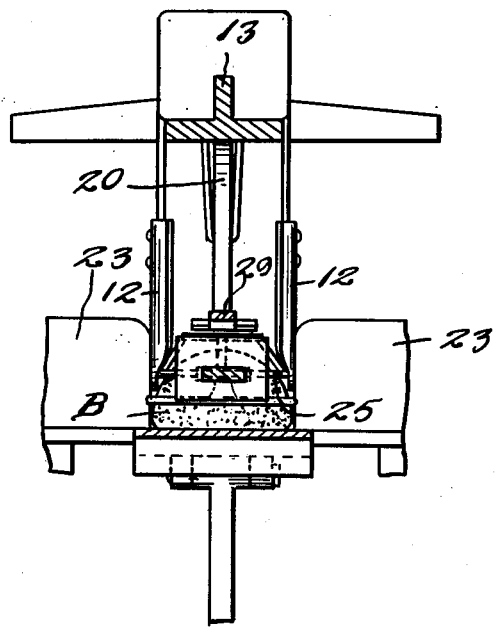
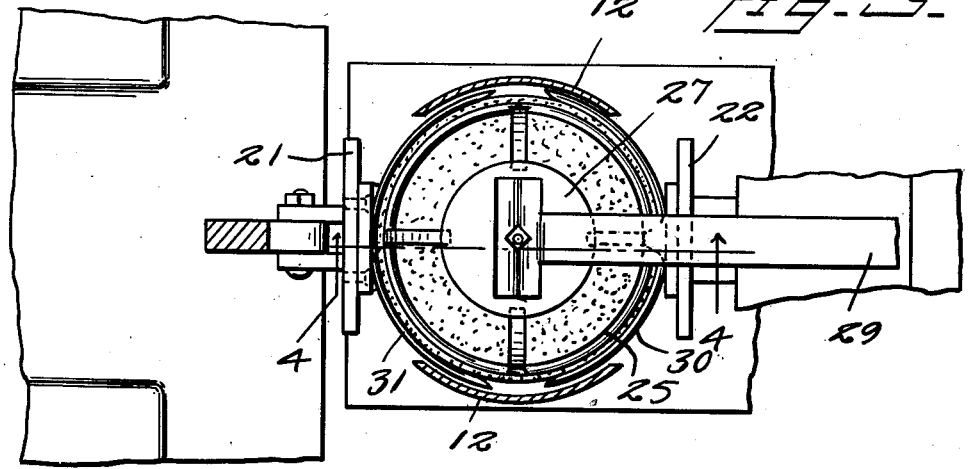
INVENTOR
Benjamin Stern
BY Kimmel & Crowell
ATTORNEYS Sept. 2, 1952 B. STERN 2,608,811
BREAD WRAPPING MACHINE
Filed Feb. 5, 1951 3 Sheets-Sheet 3
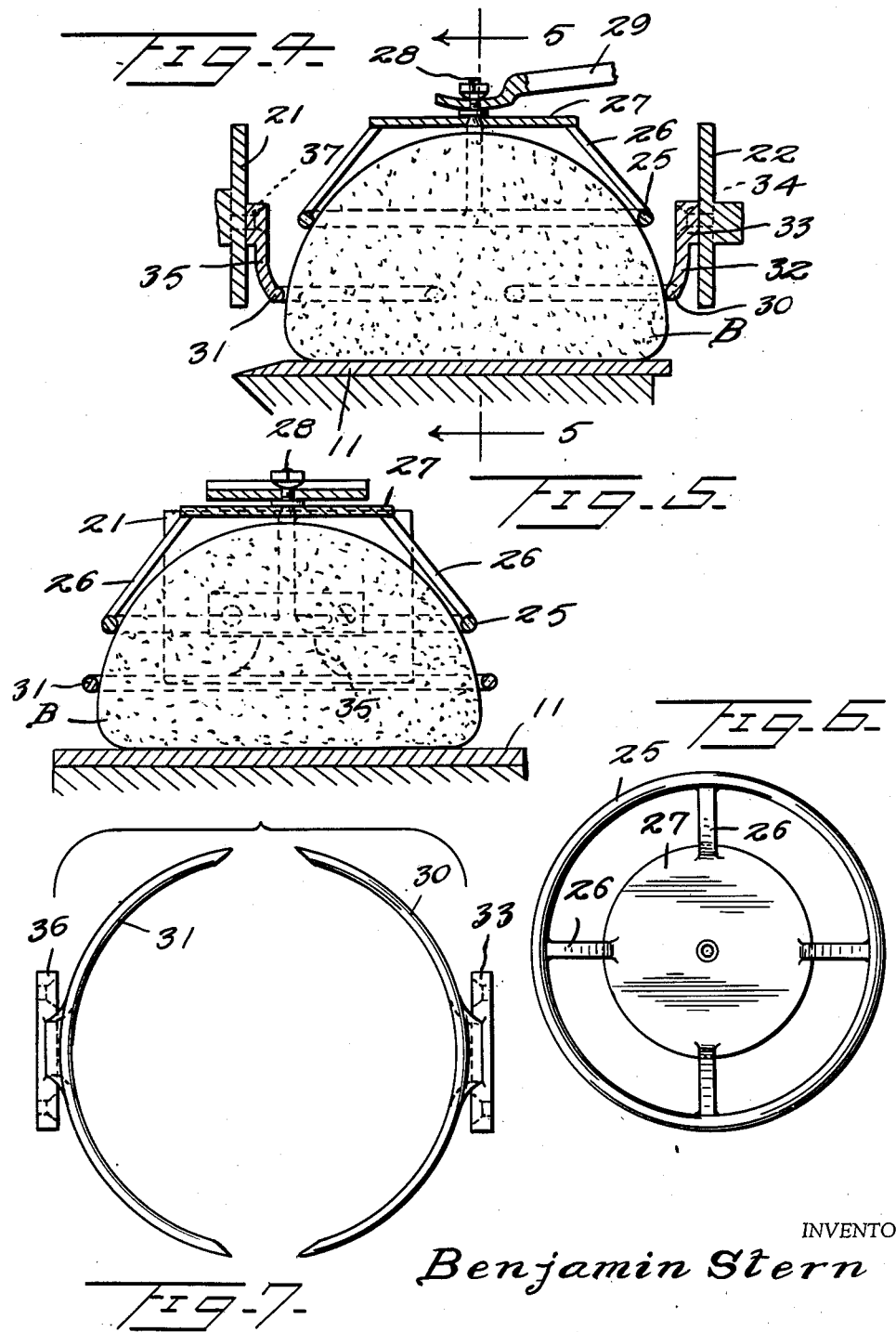
INVENTOR
Benjamin Stern
BY Kimmel & Crowell
ATTORNEYS Patented Sept. 2, 1952

UNITED STATES PATENT OFFICE 2,608,811

BREAD WRAPPING MACHINE

Benjamin Stern, Brooklyn, N. Y., assignor to Koster's Bakery Co., Brooklyn, N. Y., a firm Application February 5, 1951, Serial No. 209,376

3 Claims. (Cl. 53—122)

1

This invention relates to bread wrapping machines.

In bread wrapping machines of the type disclosed in Patents Nos. 1,977,307 and 2,022,911, issued October 16, 1934, and December 3, 1935, respectively, the machines are designed for wrapping the conventional oblong bread loaf. It is an object of this invention to provide a means in the form of an attachment whereby the machines disclosed in the patents, supra, may be converted in a manner whereby round loaves, such as round loaves of rye bread or the like, may be easily and quickly wrapped in a heat-sealed wrapper.

Another object of this invention is to provide an attachment of this kind which can be easily and quickly applied without changing the present parts of the machine, so that the same machine can be used for wrapping either round or oblong loaves of bread.

A further object of this invention is to provide an attachment for wrapping round loaves which will hold the wrapper snugly about the loaf until the wrapper is sealed.

With the above and other objects in view, my invention consists in the arrangement, combination and details of construction disclosed in the drawings and specification, and then more particularly pointed out in the appended claims.

In the drawings:

Figure 1 is a fragmentary vertical section of a bread wrapping machine having an attachment mounted thereon constructed according to an embodiment of this invention.

Figure 2 is a fragmentary sectional view taken on the line 2—2 of Figure 1.

Figure 3 is a fragmentary sectional view taken on the line 3—3 of Figure 1.

Figure 4 is a fragmentary sectional view taken on the line 4—4 of Figure 3.

Figure 5 is a fragmentary sectional view taken on the line 5—5 of Figure 4.

Figure 6 is a bottom plan view of the circular bread wrapper holding member.

Figure 7 is an exploded bottom plan of the two substantially semi-circular wrapper holding members.

Referring to the drawings the numeral 10 designates generally a conventional bread wrapping machine similar to that disclosed in Patents Numbered 1,977,307 and 2,022,911, supra. The machine disclosed in the above mentioned patents embodies an elevator 11 which is vertically movable to raise a bread loaf B upwardly to a position for contact by means of a pair of

2 transversely arcuate wrapper holding members or presser plates 12 which are carried by a vertically rockable lever or arm 13 of an extent of arc less than 90°. The lever or arm 13 is pivoted on a pivot member 14 carried by a horizontally slidable carriage 15, and the arm 13 includes a roller 16 carried by the rear of arm 13 which is movable in a track or guide 17 formed in an upstanding plate 19. Movement of the carriage or slide member 15 will cause roller 16 to move forwardly in the track 17, and the configuration of track 17 will provide for the cyclic rocking of arm or lever 13. Arm or lever 13 has pivotally mounted on the forward end thereof a curved lever 20 having a plate 21 pivotally mounted thereon which is adapted to engage one side of a bread loaf. A pusher plate 22 is carried by a rock lever 23 and is adapted to confront and engage the opposite side of the bread loaf from plate 21 so that when the loaf is held between the pairs of plates 12, 21, and 22, the forward movement of carriage 15 will move the loaf forwardly between a pair of heaters 23 and over a heating table 24.

The above described apparatus is more clearly shown in the patents supra and the apparatus is designed primarily for the wrapping of oblong bread loaves. In order to provide a means whereby a round bread loaf may be neatly wrapped in the same machine as hereinbefore described, I have provided a wrapper pressing ring 25 which has extending upwardly therefrom a plurality of upwardly convergent radial arms 26. The arms 26 are secured to a disc shaped plate 27, and plate 27 is secured by fastening means 28 to a rock lever 29. The rock lever 29 forms a part of the conventional bread wrapping machine. The ring 25 is of such size that it will encircle the upper portion of the round loaf B as clearly shown in Figures 4 and 5.

The wrapper engaging about the bread loaf B is also snugly pressed against the loaf by means of a pair of substantially semi-circular presser bars 30 and 31. Presser bar 30 is secured to the pusher plate 22 by forming an upwardly projecting arm 32 which has secured thereto a horizontally disposed base plate 33. The plate 33 is adapted to be secured by fastening means 34 to the forward side of pusher plate 22. The semi-circular pressing member 31 has extending upwardly therefrom an arm 35 which has fixed thereto a plate or base member 36 secured by fastening means 37 to the inner side of plate 21. The two semi-circular wrapper pressing members 30 and 31 contact with the loaf and the wrapper engaging thereabout at a point substantially below the ring 25 so as to snugly hold the wrapper about the loaf as the latter is moved forwardly to a point between the heater members 23 and the bottom heating plate 24.

In the use and operation of this attachment the presser or hold down ring 25 is secured to the rock lever 29. The two semi-circular presser members 30 and 31 are secured to the inner faces of the plates 21 and 22. The ring 25 will smooth out the wrapper engaging about the upper portion of the bread loaf B; whereas, the semi-circular presser members 30 and 31 will also smooth out the wrapper about the bread loaf B adjacent the lower portion of the loaf. The machine will operate in the conventional manner after the wrapper pressing members engage the wrapper about the loaf so that the loaf will subsequently be moved forwardly over the bottom heater 24 and the side heaters 23. As the loaf is moved forwardly between the heaters 23 lever arm 13 will be raised upwardly to disengage the side presser members 12 and the presser member 31 from the loaf. The presser member 30 forms the pusher or ram which will move the loaf forwardly to a point between side conveyors forming part of the machine 10 whereupon the pull of the conveyors will pull the loaf B from beneath the circular presser member 25.

The attachment hereinbefore described will provide a means whereby the bread wrapping machine which has been designed for wrapping of oblong loaves may be also used for the wrapping of round loaves of bread.

What is claimed is:

1. An attachment for a bread loaf wrapping machine for round loaves, said machine having a supporting frame and a movable carriage, a pair of opposed arcuate wrapper presser plates engageable against the opposite sides of the loaf, and a lever having an end overlying the top of the loaf secured to said plates for moving the same, whereby round bread loaves may be wrapped by said machine, said attachment comprising a ring engageable about the upper portion of the loaf, a plate above said ring, upwardly convergent arms fixed between said ring and said last-mentioned plate, means connecting said plate to said carriage for simultaneous movement therewith, a pair of substantially semi-circular arcuate presser bars for encircling said loaf and said wrapper, said presser bars overlying the edges of said presser plates, means carried by said bars for securing the latter to said carriage in confronting position relative to each other and at substantially right angles to said presser plates whereby said plates and said bars press the wrapper closely about said loaf, and means for moving said carriage linearly to shift said wrapped loaf.

2. In a bread loaf wrapping machine having a frame, a loaf supporting elevator, wrapper presser plates engageable against the opposite sides of the loaf and a lever overlying the top of the loaf connected to said plates, an attachment whereby round bread loaves may be wrapped by said machine, said attachment comprising a ring engageable about the upper portion of said loaf, means securing said ring to said frame in downwardly offset position relative thereto for engagement over the top of said loaf, and a pair of arcuate bars, one of said bars being connected to said lever and movable with said plates, said bars being disposed below said ring to thereby press a wrapper about the loaf when said loaf is raised by the elevator.

3. In a bread loaf wrapping machine having a frame, a loaf supporting elevator, wrapper presser plates engageable against the opposite sides of the loaf and a lever overlying the top of the loaf connected to said plates, an attachment whereby round bread loaves may be wrapped by said machine, said attachment comprising a ring engageable about the upper portion of said loaf, means securing said ring to said frame in downwardly offset position relative thereto for engagement over the top of said loaf, a pair of arcuate bars, one of said bars being connected to said lever and movable with said plates, said bars being disposed below said ring to thereby press a wrapper about the loaf when said loaf is raised by the elevator, the other of said bars being linearly movable with said frame to move said loaf from said elevator after wrapping.

BENJAMIN STERN.

REFERENCES CITED

The following references are of record in the file of this patent:

UNITED STATES PATENTS

| Number | Name | Date |
|---|---|---|
| 1,646,496 | Sandberg | Oct. 25, 1927 |